April 17, 1928.

L. P. CALDWELL

VEGETABLE MATTER DRIER

Filed Dec. 17, 1926

1,666,617

3 Sheets-Sheet 1

INVENTOR.
Louis P. Caldwell.

April 17, 1928.  
L. P. CALDWELL  
VEGETABLE MATTER DRIER  
Filed Dec. 17, 1926  
1,666,617  
3 Sheets-Sheet 2
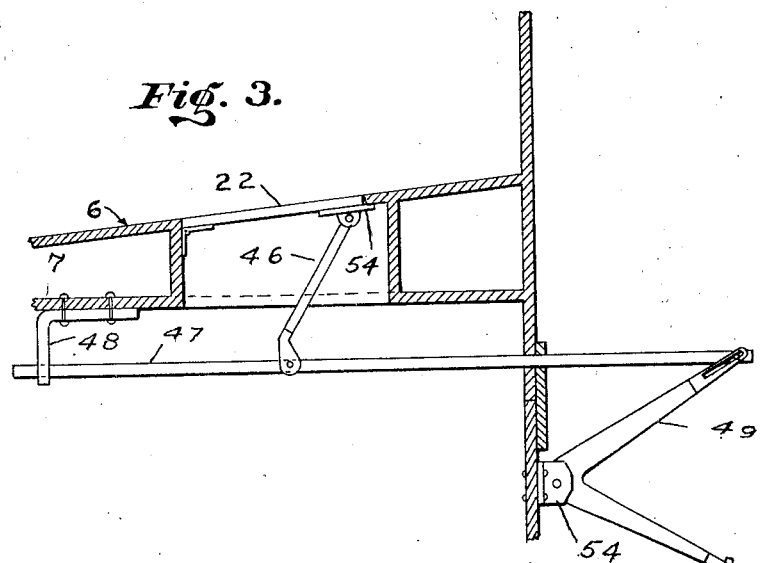
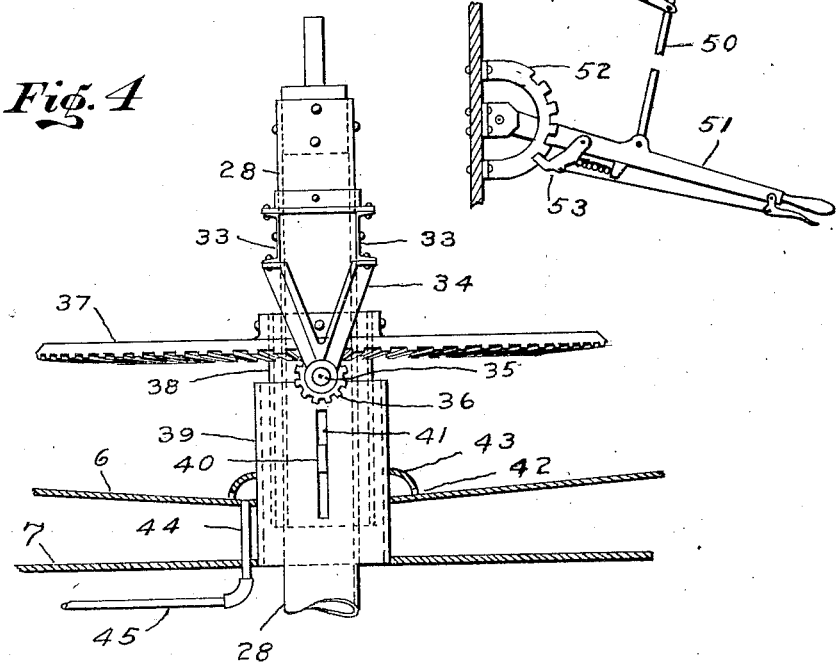
INVENTOR.  
Louis P. Caldwell.

April 17, 1928.  
L. P. CALDWELL  
1,666,617  
VEGETABLE MATTER DRIER  
Filed Dec. 17, 1926  
3 Sheets-Sheet 3
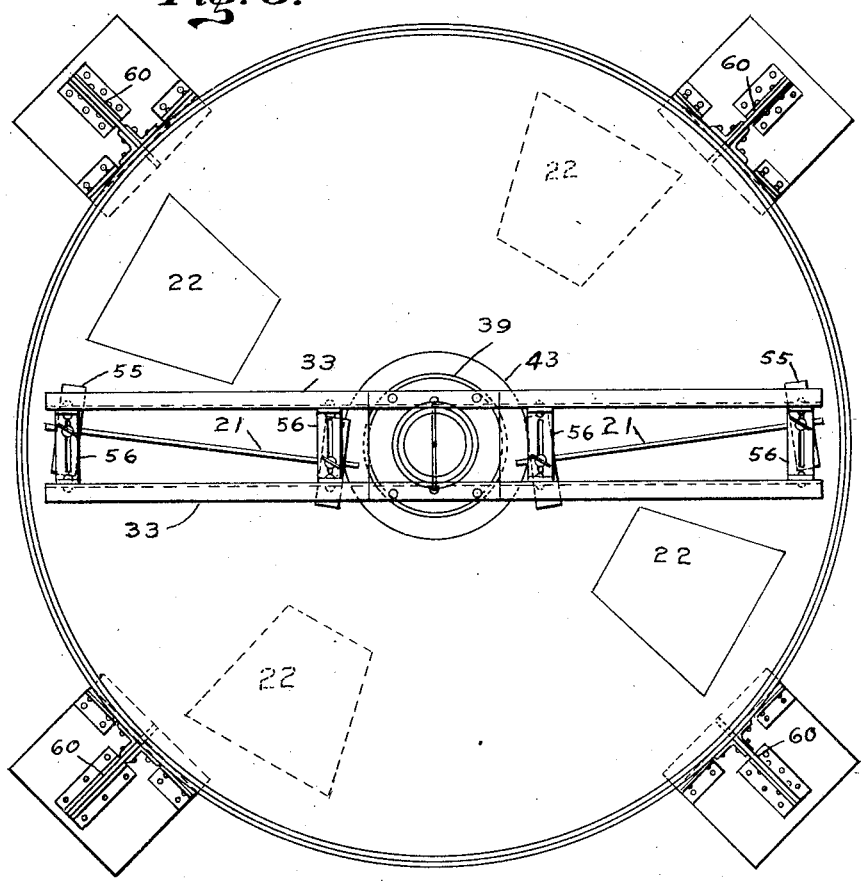
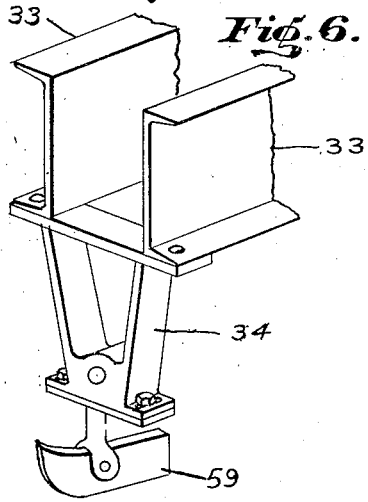
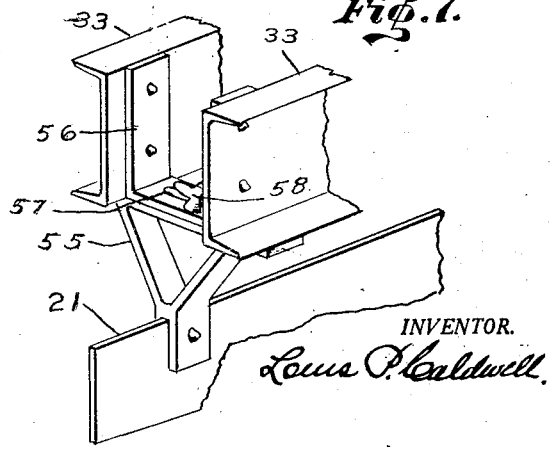
INVENTOR.  
Louis P. Caldwell.

Patented Apr. 17, 1928.

1,666,617

UNITED STATES PATENT OFFICE.

LOUIS P. CALDWELL, OF KANSAS CITY, MISSOURI.

VEGETABLE-MATTER DRIER.

Application filed December 17, 1926. Serial No. 155,516.

My invention relates to the process of extracting moisture from garbage or other vegetable matter by means of a plurality of individually heated compartments superimposed upon each other having means provided in each compartment to permit flow of liquid from the matter being treated, and means for stirring the matter while in each compartment; and means for controlling the flow of the matter to be delivered out of each compartment into the next compartment beneath it; and has for its objects the continuous operation by admitting raw material at a rate equal to that drawn off when completely treated; and the further object of returning the matter to a form in which a useful purpose will be served, such as reclaiming food for stock in treating garbage.

Instead of depending solely upon heat to extract moisture I employ means for stirring the matter to keep it opened up to augment the evaporation process created by heat.

Figure 1:
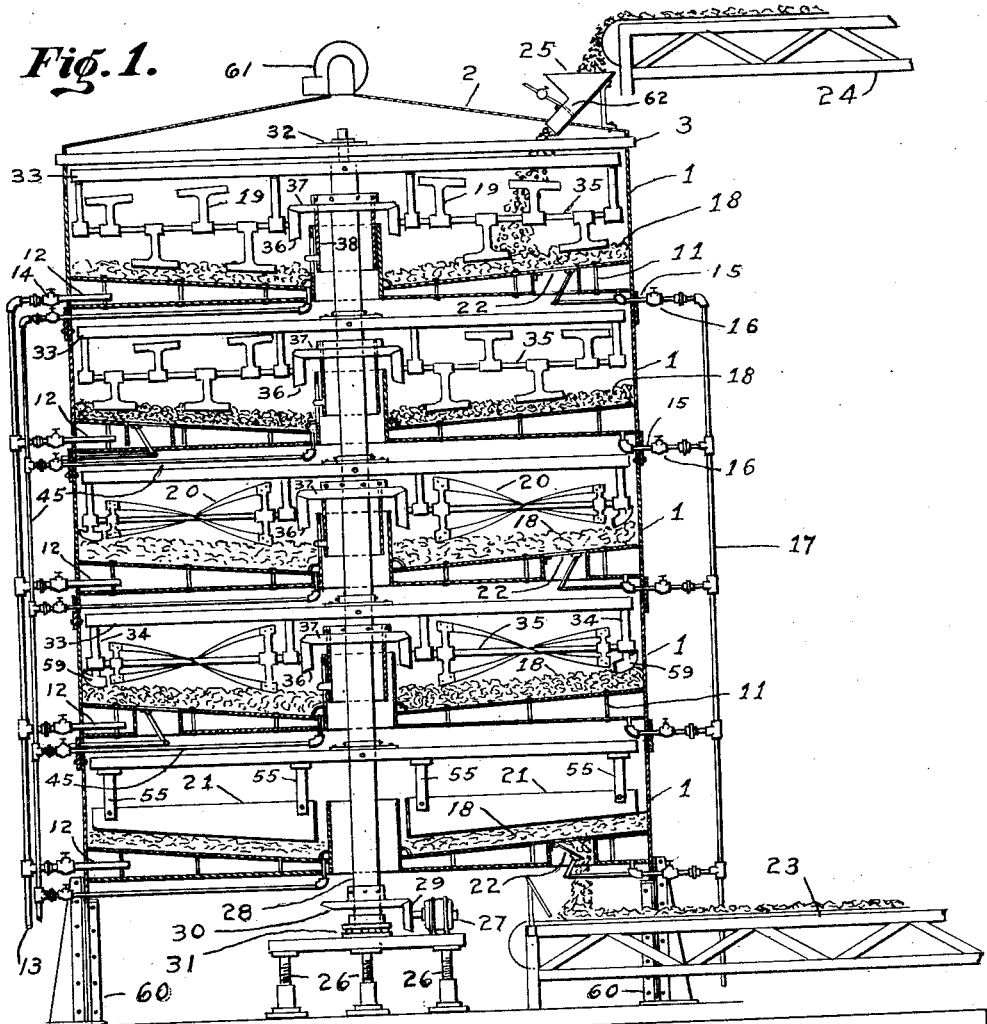
Figure 2:
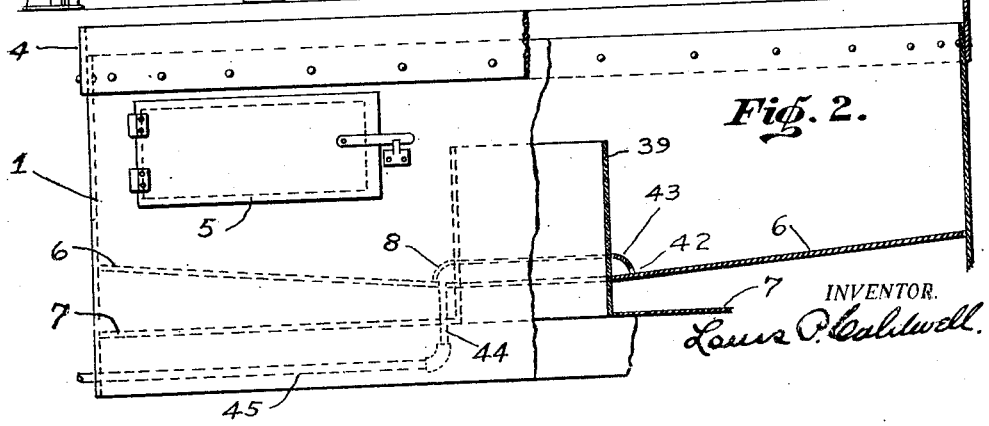

I attain these objects by means of heat and the mechanisms illustrated in the accompanying three sheets of drawings in which Fig. 1, is a vertical cross sectional elevation of my invention complete and in full operation; Fig. 2, is an enlarged view of one of the compartments in partial broken section; Fig. 3, is an elevation, in broken section, showing the means of operating the doors that are in the bottom of each compartment; Fig. 4, is an enlarged view in broken section of the stirring mechanism provided for each compartment employing stirrers; Fig. 5, is a plan view of one of the compartments containing the scraper and showing the relation of the bottom doors of each compartment; Fig. 6, is a perspective view of one end of a stirring arm carrying a scraper; Fig. 7, is a perspective view of one end of the scraper that operates in the bottom compartment to push out the matter onto a conveyor.

Similar numerals refer to similar parts throughout the several views.

The cylindrical compartments 1 are all alike and are superimposed on each other, and are held in alignment by means of bands 4 which are secured to the top of each compartment so that the bottom of the one above it will enter this band and rest on the top of the one beneath, and each compartment is provided with a door 5, Fig. 2, for use in inspection and to enter to make repairs.

The bottoms of the compartments are composed of an upper member 6 and a lower, or outside bottom 7 that are stabilized by stay bolts 11 to withstand steam pressure that is admitted through pipe 12 that is connected to main steam pipe 13 and the flow of steam is controlled by means of valve 14, Fig. 1, and the exhaust steam is released from the space between the two bottom members 6 and 7 through pipe 15 and valve 16 to exhaust main 17. The steam is, in this case, employed to produce heat for each compartment; but heat may be produced by other means between the upper and lower members 6 and 7 when desired, the heat serving to induce evaporation of liquids in the matter 18.

The evaporation is augmented by means of stirrers 19 and 20 which turn the matter over and over, and when fully treated the matter is scraped around the bottom of the lower compartment by scrapers 21, Fig. 1, till it is emptied through door 22 onto conveyor 23.

The matter to be treated is admitted from conveyor 24 to a chute 25 in the upper compartment where the treatment begins. The door 22 of the uppermost compartment being held open a predetermined distance to allow the matter to gradually work down into the next compartment the door 22 of which is also open to allow a portion of the matter to flow to the next compartment below, as are all the other compartments below, including the bottom one that delivers its contents onto conveyor 23.

The doors 22, Fig. 1, are shown closed in the view so as to detain the matter being treated till inspection, through doors 5, Fig. 2, may be made, whereupon, after each compartment has held its contents long enough to properly evaporate the liquids to meet the requirements of the fully treated matter, the doors 22 of all the compartments are opened just enough to allow a flow of the matter continuously at a rate of speed to properly evaporate the moisture by the time it reaches the bottom compartment when it will be useful as stock food, when garbage is the material treated.

The stirring mechanism is adjustable, and, in Fig. 1, is shown at its uppermost adjustment and nearly free from engagement with matter 18 a distance of a few inches from the floor 6 of each compartment, and as the treatment proceeds, and inspection, through doors 5, Fig. 2, discloses that the stirring and evaporating process should begin, the stirrers 19 and 20 and scrapers 21 are lowered to closer relation to bottoms 6 of the compartments by means of jack screws 26, Fig. 1, which carry a frame on which main driving motor 27 is mounted that rotates the shaft 28 through gear 29 on the motor meshed with gear 30 of said shaft. The shaft rotates with light friction on ball bearing 31 at its bottom and bearing 32 at its top. The main shaft 28 carries secured thereto arms 33, Figs. 4, 5, and 6, said arms carrying bearings 34 that hold shaft 35 in alignment to mesh gears 36 with large gear 37, the latter gear is carried on a short hollow shaft 38 which operates slidably in pipe 39 that is secured to both members 6 and 7 of the bottom of each compartment. A flat key 40 secured to hollow shaft 38 operates in slot 41 of pipe 39 to prevent it and gear 37, that it carries, from rotating, but allows an upward and downward movement of 38 and the said gear so the gear can remain in mesh with gears 36 when main shaft 28 is raised or lowered to adjust the stirrers and scraper to properly stir and scrape the matter 18 along the bottoms of the compartments during the treatment the matter must have to exclude the moisture and oils, or liquids it contains.

The oils and liquids that do not evaporate, that are carried in matter 18, are removed by gravity through holes 42 in bustle 43, Fig. 4, that surrounds pipe 39 forming a cavity into which pipe 44 enters to receive the liquids and oils that pass into drain pipe 45.

The dump door 22, Fig. 3, one or more of which is mounted in the bottom of each compartment are operated to be opened and held in position by link 46 that engages pivot 54 carried by the door and is pivotally engaged to bar 47 that is guided through bracket 48 and the wall of the compartment and extends outside to engagement with crank 49 that is pivotally mounted in bracket 54 and carries rod 50 that extends down near the working floor to bring lever 51 in reach of an operator where he may set the door in closed position as shown in Fig. 3, or at several degrees of opened position by operating lever 51 to engage dog 53 in any one of the notches of quadrant 52, thus providing means of setting the doors of each compartment to suit the required delivery from the compartments to provide flow of raw material to be treated into the top and out at the bottom through the several compartments.

The scrapers 21, Fig. 7 are mounted in brackets 55 secured by a bolt with wing nut 58, said bolt operating in slot 57 of spreader 56 that is secured to arms 33. The scraper 21 may be adjusted to the position shown in Fig. 5, and one of these scrapers serving to push the matter 18 outwardly toward the wall of the compartment, the other to push it toward the middle, thus pushing the matter so it will pass over the doors 22 in its movement back and forth about the floor.

The stirrers are composed of paddles 19, Fig. 1, in the upper compartments, and of helical sweepers 20, Fig. 1 for other compartments below while the bottom compartment has the scraper 21, therefore shafts 35 are required only where rotating stirrers are used. These stirrers are rotated by gears 36 on shafts 35 meshing with large gear 37 which does not rotate, but shaft 28 carries arms 33 and bearings 34 in which shaft 35 is carried, around gear 37 and produces a desired movement of the stirrers. This movement is a backward movement of the stirrers as they advance forward around gear 37, thus moving matter 18 ahead of the paddles or helical sweepers so that the stirring is complete, which would not result if the paddles and sweepers rolled in the opposite direction, over it. The sweepers are provided with shoe scrapers 59 subtended from the bearing bracket 34, Fig. 6, that are set at an angle to scrape the matter 18 inwardly so that the sweepers will engage it and stir it.

In Fig. 5, two doors 22 are shown in the bottom of the compartment and by dotted lines two doors are shown of the next compartment beneath it. The plurality of doors is provided to admit a larger quantity of matter 18 to be dumped at each revolution than one door would admit, and the doors shown in dotted lines in the compartment below are shown in staggered relation to the doors above so matter dumped from above will fall on the floor of the compartment and not on through another door.

It may be seen that by the arrangement of a plurality of compartments standing upon a footing of steel columns 60, each compartment carrying means for stirring its contents and doors for dumping the same, in varying quantities per revolution of the stirrers, when heat is supplied within the double bottoms of the compartments, and a ventilating means consisting of a suction fan 61 on the top of cover 2 and space around main shaft 28 inside of pipe 39 for air to pass, that vapors that are caused to rise from the matter being treated, will be removed from within the several compartments and be dissipated into the air, and, further, that the process of admitting raw vegetable matter into the top compartment and detaining it there till several revolutions of the stirrers have been made, a portion of moisture will be evaporated out of it, and in each succeeding compartment another portion of moisture will be removed until enough moisture has been removed to make a fairly dry material that will result when such vegetable matter as garbage is treated by my invention.

Without departing from the principles of my invention I do not confine myself to the treatment of garbage or other vegetable matter but hold that my invention will properly treat any matter in proper form to operate in the same.

I claim:

1. Apparatus for extracting moisture from matter consisting of a plurality of individually heated and communicating compartments superimposed upon each other, each compartment having an inclined floor with a central opening, a pipe in said opening, a bustle around said pipe, holes in said bustle communicating with a drain pipe to receive, by gravity, liquids that accumulate on said floor, substantially as described.

2. Apparatus for extracting moisture from matter consisting of a plurality of individually heated and communicating compartments superimposed upon each other, inclined floors in each compartment, having central openings, pipes in the openings, bustles around said pipes, the bustles being provided with holes communicating with drain pipes, a hollow shaft slidably mounted in each of said pipes, keys on said hollow shafts projecting into vertical slots in said pipes for preventing rotation of said hollow shafts, gears on said hollow shafts, stirrers in each compartment, a central rotatable shaft for rotating the stirrers about its axis, and gears on the stirrers meshing with gears on the hollow shafts for rotating the stirrers about their axis, substantially as shown and described.

3. Apparatus for extracting moisture from matter consisting of a plurality of individually heated and communicating compartments, inclined floors in the compartments, central openings in the floors, with pipes in the openings, bustles around the pipes, slidable hollow shafts in the pipes, keys in the hollow shafts projecting into vertical slots in said pipes to prevent rotation of said hollow shafts, gears on said hollow shafts, stirrers in each compartment, a central rotatable shaft for rotating the stirrers about its axis, and gears on the stirrers meshing with gears on the hollow shafts for revolving the stirrers about their axis, screw jacks under said central rotatable shaft for adjusting the stirrers it carries to varying distances above the inclined floors of the compartments, substantially as shown and described.

LOUIS P. CALDWELL.